United States Patent Office 3,621,656
Patented Nov. 23, 1971

3,621,656
GENERATION OF ENERGY IN A GAS CYCLE
Pierre Henri Pacault, Ville d'Avray, and Francis J. Mary, Paris, France, assignors to Babcock-Atlantique Societe Anonyme, Paris, France
Filed Jan. 3, 1969, Ser. No. 788,748
Claims priority, application France, Jan. 10, 1968, 135,423
Int. Cl. F02c 7/14
U.S. Cl. 60—39.02      7 Claims

ABSTRACT OF THE DISCLOSURE

Energy is generated in a gas cycle by establishing a refrigeration cycle by mechanical compression of a cold-producing fluid and by lowering the cold source temperature of the gas cycle by heat exchange with the cold-producing fluid. The apparatus provided for this process includes a refrigerating machine for compression of the cold-producing fluid and means for performing a heat exchange between the same and the working fluid.

BACKGROUND OF THE INVENTION

The present invention relates to a process and apparatus for generating energy in a gas cycle. The gas cycle may be open or closed. More particularly, the invention relates to apparatus of the kind comprising a compressor for pressurisation of a working fluid, a source of heat for increasing its temperature, a turbine through which it is decompressed, and a useful load driven by means of the turbine.

The applicants find that by lowering the temperature at the cold source of the working fluid by compression and release of a cold-producing fluid, without changing the conditions of rate of flow, temperature and inflow pressure to the gas turbine, the latter may be induced to generate a higher supplement of energy than that required to obtain this drop of temperature at the source.

To take a particular case in which power is taken from the shaft of a turbine driving an alternator, application of this power to cool the working fluid at the source, renders it possible, for identical conditions of rate of flow, temperature and inflow pressure to the turbine, to increase the power supplied by the turbine to the alternator.

SUMMARY

The invention thus provides a new process and device which render it possible to increase the useful rated power of a gas cycle plant, without changing the structural features of the gas turbine or its rate of operation.

According to the invention a process for generation of energy in a gas cycle comprises establishing a refrigeration cycle by mechanical compression of a cold-producing fluid and lowering the cold source temperature of the gas cycle by heat exchange with the cold-producing fluid.

The invention also includes apparatus for generation of energy in a gas cycle by the process described above which apparatus comprises a gas turbine, a compressor for the working fluid and a heat source, in combination with a refrigerating machine employing mechanical compression of the cold-producing fluid and means of performing a heat exchange between the same and the working liquid.

According to the arrangements described in U.S. co-pending patent application filed in the names of Pacault, Cosar, and Mary, Ser. No. 786,925, filed Dec. 26, 1968 (now abandoned) for "Refrigeration Methods and Apparatus" the cold-producing fluid previously compressed then cooled to a temperature close to ambient, is preferably distributed between several parallel circuits in which it is decompressed to a pressure varying from one circuit to another. After decompression, each fraction of cold-producing fluid is evaporated in a convection exchanger swept by the working fluid. The latter is thus cooled in each successive stage whilst transferring the required heat of vapourisation to the fraction of the cold-producing fluid traversing its exchanger. The vapour formed is conveyed to an intermediate stage of the compressor, in which it is mixed with the vapour partially compressed in the lower stage or stages, to be compressed to the final pressure common to all.

DESCRIPTION OF THE PREFERRED EMBODIMENT

Figure 1:
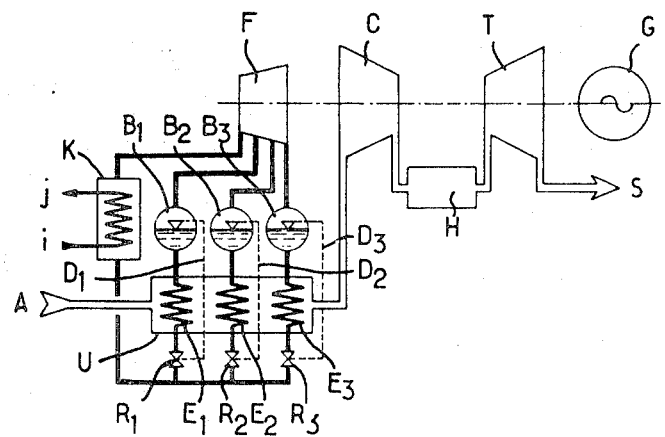
FIG. 1 by way of example illustrates diagrammatically a plant for generation of energy in a gas cycle.

The example chosen and illustrated in FIG. 1 relates to an open cycle plant in which a working fluid, which in this example is air, drawn in at A passes successively through a compressor C, a combustion chamber H and a gas turbine T. The turbine T has its exhaust at S and drives a current generator G.

Between the orifice A for intake of air from the outside and the infeed of this air to the compressor C, is arranged a refrigerating machine possessing three stages which machine operates in a closed circuit and comprises a compressor F drawing cooling fluid vapour from three vessels B1, B2, B3 in which different pressures prevail, each corresponding to a take-off stage of the compressor F.

At the end of the compression, the vapour is cooled and condensed in a convection exchanger K whilst transferring its heat to the circulating water which enters at $i$ a nest of tubes, and is discharged at $j$.

The fluid liquified in the exchanger K is then depressurised in three valves R1, R2, R3 arranged in parallel and each supplying one of three nests of evaporator tubes E1, E2, E3.

The opening of the valves is controlled separately by means of corresponding level detectors D1, D2, D3, in such manner that the liquid is kept at a constant level in each of the vessels B1, B2, B3.

Each nest of tubes E1, E2, E3, together with its case, forms a "boiler" comprising return pipes which, for clarity, are omitted from the drawing.

The three nests of evaporator tubes E1, E2, E3 are enclosed in a casing U traversed by air coming from A. This air is cooled whilst supplying the heat of vapourisation transmitted by the nests of tubes to the fluid traversing the refrigerating machine.

At least in this example, the aggregate of the rotary machines, inclusive of the alternator G and the compressors C and F, is coupled to a single shaft, which represents the simplest solution. Alternatively, however, the compressor F may be driven by means of a reduction gear, with or without a separate electric motor.

Figure 2:
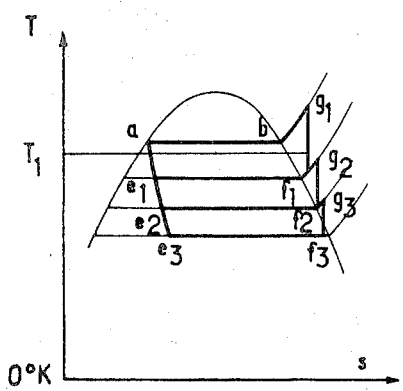
FIG. 2 is a diagram illustrating cycles of conversion of cold-producing fluid for the plant shown in FIG. 1, the entropy being the abscissa.

FIG. 2 illustrates the operation of the refrigerating machine in the temperature-entropy diagram T, $e$. The cycles corresponding to each of the three stages are shown in the diagram, superimposed, so that the entropy variations are not applicable to the same mass during the different conversions.

The lines $g_1$–$b$ and $b$–$a$ depict the cooling and condensation of the total mass of fluid circulating in the refrigerating machine. This is the function of the exchanger K.

At $a$–$e_1$, $a$–$e_2$ and $a$–$e_3$, are plotted, partially superimposed, the decompressions of the fluid by flow in the valve R1, R2, R3 of FIG. 1.

The straight lines $e_1$–$f_1$, $e_2$–$f_2$ and $e_3$–$f_3$ respectively illustrate the evaporations of the masses of fluid traversing the units E1, E2, E3 and engendering the successive cooling actions on the air sweeping the nests of tubes.

The consecutive compressions in F are depicted by the lines slightly inclined to the vertical and terminating, respectively, at the points marked by the references $g_3$, $g_2$ and $g_1$.

After each inflow of saturated vapour into the compressor F, coming from the vessels B2 and B1, the fluid already compressed undergoes cooling along the corresponding isobars $g_3$–$f_2$ and $g_2$–$f_1$, so that the compression curve element of each mixture thus produced is displaced towards the decreasing entropies.

The fractionation into stages of the evaporating thus has the advantageous result of reducing the degree of superheating at the end of the compression, i.e. at the point $g_1$, and of endowing the total cycle of the refrigerating machine with a form close to that of a CARNOT cycle.

Figure 3:
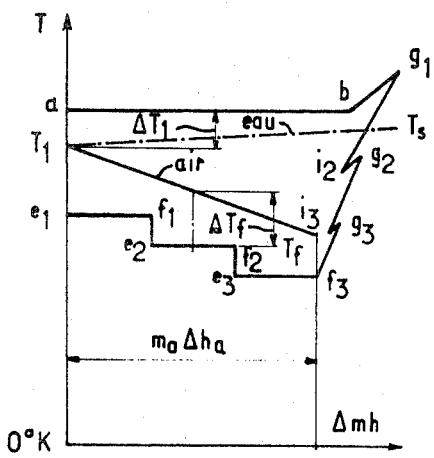
FIG. 3 illustrates these same conversions of cold-producing fluid by means of a diagram taking the rates of enthalpy flow as the abscissae.

Still with regard to the plant shown in FIG. 1, the diagram of FIG. 3 illustrates the evolution of the temperatures T as a function of the variations in enthalpy flow rate delta-$mh$, with the same references as those employed in FIG. 2. The lines $e_1$–$f_1$, $e_2$–$f_2$ and $e_3$–$f_3$ again illustrate the three stages of vapourisation of the auxiliary fluid which receives its heat from the air $m_a$, whose temperature decreases from $T_1$ to $T_f$ whilst incurring an enthalpy drop delta-$h_a$ per kg. The flow of heat $m_a$ delta-$h_a$ thus transferred under a mean temperature differential delta-$T_f$, corresponds to the abscisa dimension measuring the sum of the three vapourisation stages.

In the right-hand part of the diagram of FIG. 3, are illustrated the three compression stages $f_3$–$g_3$, $i_3$–$g_2$ and $i_2$–$g_1$. The lines $g_1$–$b$ and $b$–$a$ represent the cooling and the condensation respectively of the cold-producing fluid, the drop in enthalpy flow of the fluid being balanced by the heating of the flow of circulating water. The temperature of this water follows the line $T_1$–$T_s$ shown in chain lines. It is apparent that the temperature difference delta-$T_1$ between the condensation stage $a$–$b$ and ambient $T_1$ exceeds the true temperature difference in the heat transfer. This last transfer has a "constriction" abreast of the point $b$ which denotes the transition between cooling and condensation.

Figure 4:
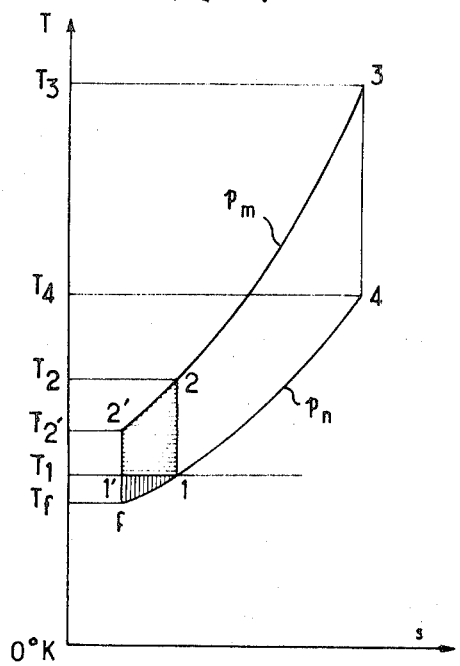
FIG. 4 illustrates a theoretical working fluid cycle for a gas turbine.

The advantages secured by the invention will be appreciated from an examination of the temperature-entropy diagram of FIG. 4 which, for the working fluid, illustrates a perfect cycle corresponding to a cold source temperature $T_1$, and defined by two isobars $p_m$, $p_n$ and two isoentropic lines 3–4 and 1–2, the area of the curvilinear quadrilateral 1–213–4 measuring the theoretical useful work supplied by one kg. of fluid evolving according to this cycle.

If the cold source temperature is lowered from $T_1$ to $T_f$ along the isobar $p_n$, whilst retaining the same compression ratio $\zeta = p_m/p_n$, as well as the temperature $T_3$ of inflow to the gas turbine, the theoretical useful work supplied per kg. of working fluid is increased by a quantity represented by the area of the curvininear trapezium $f$–$2'$–$2$–$1$, whereas the theoretical work required to lower the cold source temperature from $T_1$ to $T_f$ is measured by the area of the vertically hatched curvilinear triangle 1–1'–$f$, which on the whole represents a gain of energy represented by the horizontally hatched area 1'–2'–2–1. It will thus be appreciated with regard to the diagram of FIG. 4, that the energy required to cool the working fluid from $T_1$ to $T_f$ is no more than a fraction of the gain of energy obtained in the cycle.

The cost of installation of the refrigerating machine is at least partially offset by a saving in the cost of the compressor C, whose size may be reduced owing to the fact that the reduction in the temperature of the working fluid is accompanied by a reduction in its specific volume.

In certain applications, it is advantageous to choose a cold-producing fluid possessing a low specific volume at the temperatures of operation. For example, difluoro-dichloro-methane ($CF_2Cl_2$) or Freon 12, and difluoro-monochloro-methane ($CHF_2Cl$) or Freon 22, are appropriate at temperatures close to $-35°$ C.

We claim:

1. Apparatus for generating a mechanical power output, comprising working-fluid supply means, a compressor for working fluid supplied by said means, a gas turbine, means including a heater supplying compressed working fluid to said gas turbine, and a refrigerating system including means driven by said gas turbine for mechanically compressing and recirculating a cold-producing fluid, said working-fluid supply means including means performing a heat exchange between the cold-producing fluid and the working fluid prior to supply of working fluid to said compressor, said means for mechanically compressing the cold-producing fluid having several intake stages, and said refrigerating system having several vaporizers in communication, respectively, with the said stages and assuring corresponding parallel flows of the cold-producing fluid.

2. A thermic power plant for generating mechanical power as its end product, comprising working-fluid supply means, a compressor for working fluid supplied by said means, a gas turbine having a rotary mechanical output, means including a heater supplying compressed working fluid to said gas turbine, and a refrigerating system including means mechanically driven by said gas turbine for mechanically compressing and recirculating a cold-producing fluid, the mechanical input-power supplied to said refrigerating system being small compared to the mechanical output of said turbine, said working-fluid supply means including means performing a heat exchange between the cold-producing fluid and the working fluid prior to supply of working fluid to said compressor, whereby a temperature gradient is used to produce mechanical power and a small fraction of that mechanical power is utilized to enhance the temperature gradient and thus further enhance the mechanical power output of said turbine.

3. A power plant according to claim 2, in which said turbine includes an output shaft to which both said working-fluid compressor and said refrigerating compressor are coupled.

4. The process of converting heat energy into a rotary mechanical output, which comprises the supply of a working fluid to a compressor and the supply by said compressor of compressed working fluid to a gas turbine having a rotary mechanical output, establishing a refrigeration cycle by mechanically tapping a fraction of the mechanical output of said gas turbine, said refrigeration cycle comprising mechanical compression of a cold-producing fluid, and establishing a heat exchange between the cold-producing fluid and the working fluid prior to supply of the working fluid to its compressor, whereby a temperature gradient is used to produce mechanical power and a small fraction of that mechanical power is utilized to enhance the temperature gradient and thus further enhance the mechanical power output of said turbine.

5. Apparatus according to claim 1, in which the vaporizers are situated along a circulation duct for the working fluid.

6. Process according to claim 4, in which the compressed working fluid is supplied to a combustion chamber prior to its supply to the gas turbine.

7. A power plant according to claim 2, in which said heater includes a combustion chamber.

References Cited

UNITED STATES PATENTS

| | | | |
|---|---|---|---|
| 2,277,647 | 3/1942 | Jones | 62—498 |
| 2,322,717 | 6/1943 | Nettel | 60—39.67 |
| 2,351,700 | 6/1944 | Patterson | 62—510 |
| 2,362,714 | 11/1944 | Nettel | 60—39.67 |
| 1,879,685 | 9/1932 | Jaczko | 62—172 |
| 2,126,266 | 8/1938 | Laird | 62—172 |
| 2,398,655 | 4/1946 | Mayer | 62—402 |
| 2,473,496 | 6/1949 | Mayer | 62—172 |
| 2,959,025 | 11/1960 | Morrison | 62—402 |
| 3,097,504 | 7/1963 | Quick | 62—402 |
| 3,364,685 | 1/1968 | Perret | 62—510 |

FOREIGN PATENTS

| | | | |
|---|---|---|---|
| 127,367 | 8/1928 | Switzerland | 62—510 |

DOUGLAS HART, Primary Examiner

U.S. Cl. X.R.

60—39.67; 62—117, 510